US012790746B2

(12) United States Patent
Hwang et al.

(10) Patent No.: US 12,790,746 B2
(45) Date of Patent: Nov. 10, 2026

(54) APPARATUS FOR ESTIMATING ABSORPTION SPECTRUM, AND APPARATUS AND METHOD FOR CORRECTING MIXING RATIO OF MONOCHROMATIC DYES

(71) Applicant: ELECTRONICS AND TELECOMMUNICATIONS RESEARCH INSTITUTE, Daejeon (KR)

(72) Inventors: Ji Yong Hwang, Daejeon (KR); Hyun Woo Oh, Daejeon (KR)

(73) Assignee: ELELCTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 442 days.

(21) Appl. No.: 18/509,462

(22) Filed: Nov. 15, 2023

(65) Prior Publication Data

US 2024/0175201 A1 May 30, 2024

(30) Foreign Application Priority Data

Nov. 30, 2022 (KR) ........................ 10-2022-0165021

(51) Int. Cl.
*D06P 1/00* (2006.01)
*B01F 35/22* (2022.01)
(Continued)

(52) U.S. Cl.
CPC ........ *D06P 1/0032* (2013.01); *B01F 35/2202* (2022.01); *G01N 21/251* (2013.01); *B01F 2101/30* (2022.01)

(58) Field of Classification Search
None
See application file for complete search history.

(56) References Cited

U.S. PATENT DOCUMENTS 6,633,408 B1 * 10/2003 Rozzi .................. H04N 1/6094 358/1.9
8,467,098 B2 6/2013 Rich et al.
(Continued)

FOREIGN PATENT DOCUMENTS

JP 2002-365133 A 12/2002
JP 2003-503682 A 1/2003
(Continued)

OTHER PUBLICATIONS

Notice of Allowance of the KR Patent application No. 10-2022-0165021 dated Feb. 11, 2026.

*Primary Examiner* — Shawn Mckinnon
(74) *Attorney, Agent, or Firm* — LRK PATENT LAW FIRM

(57) ABSTRACT

Provided are an apparatus and method for correcting a mixing ratio of monochromatic dyes. The apparatus includes a memory, and a processor connected to the memory, wherein the processor estimates a first spectrum related to an absorption ratio or absorbance of a mixed dye from a reflection ratio by concentration for each of monochromatic dyes stored in the memory, estimates, from a reflection ratio of a desired color stored in the memory, a second spectrum related to an absorption ratio or absorbance of the desired color, and corrects a mixing ratio between the monochromatic dyes used in manufacturing the mixed dye on the basis of a result of comparing the first and second spectra.

20 Claims, 13 Drawing Sheets

(51) Int. Cl.
*B01F 101/30* (2022.01)
*G01N 21/25* (2006.01)

(56) References Cited

U.S. PATENT DOCUMENTS

| | | | | |
|---|---|---|---|---|
| 8,666,163 | B2 | 3/2014 | Cho et al. | |
| 10,564,037 | B2 | 2/2020 | Jang et al. | |
| 2006/0200318 | A1* | 9/2006 | Morishita | G01N 21/6428 702/22 |

FOREIGN PATENT DOCUMENTS

| | | | |
|---|---|---|---|
| JP | 2008-111116 | A | 5/2008 |
| KR | 10-0257320 | B1 | 5/2000 |
| KR | 10-0421105 | B1 | 3/2004 |
| KR | 10-2009-0042612 | A | 4/2009 |
| KR | 10-0914952 | B1 | 8/2009 |
| KR | 10-2021-0034584 | A | 3/2021 |

* cited by examiner

FIG. 3

[STANDARD_DATA 0] FILE NAME

STD_NAME=Dye3
STD_REFLPOINTS=35
STD_REFLINTERVAL=10
STD_REFLLOW=360
} RANGE OF ABSORPTION WAVELENGTH

STD_R= 53.610831, 56.561208, 59.365326, 62.181258, 64.981371, 67.203599, 69.059253, 70.651001, 71.668756, 72.591454, 73.356056, 73.880911, 74.231285, 74.384600, 74.500066, 74.374795, 74.105763, 73.676473, 73.207235, 72.692335, 71.867019, 70.804656, 69.592237, 68.773264, 68.287295, 67.918646, 67.526746, 67.578471, 68.308747, 70.434499, 73.501879, 76.845175, 80.852163, 82.340503, 84.331477
} REFLECTION RATIO (%R) VALUE FOR WAVELENGTH

STD_CORD_ILLUM=D65/10 deg LIGHT SOURCE CONDITION

STD_X= 66.622200
STD_Y= 71.789146
STD_Z= 77.599312
} XYZ → sRGB

APPARATUS FOR ESTIMATING ABSORPTION SPECTRUM, AND APPARATUS AND METHOD FOR CORRECTING MIXING RATIO OF MONOCHROMATIC DYES

CROSS-REFERENCE TO RELATED APPLICATION

This application claims priority to and the benefit of Korean Patent Application No. 10-2022-0165021, filed on Nov. 30, 2022, the disclosure of which is incorporated herein by reference in its entirety.

BACKGROUND

1. Field of the Invention

The present invention relates to an apparatus for estimating an absorption spectrum, and an apparatus and method for correcting a mixing ratio of monochromatic dyes, and more specifically, to an apparatus and method for correcting a mixing ratio between monochromatic dyes in a dyeing process in which a desired color is reproduced by mixing monochromatic dyes.

2. Description of Related Art

Generally, a dyeing process is a process of reproducing a color requested or specified by a customer (buyer) on fabric requested or specified by the customer (buyer). Customer requirements are provided to a company together with QuickTime Extension (QTX) files (i.e., files in which computer color matching (CCM) colorimetric values are stored) in standard light sources (A/10, U35, D65, etc.), and color chips, swatch samples, and the like, and a conventional dyeing process corresponding to the requirements in such a case is shown in FIG. 9A.

Among methods for customers to transmit their requirements to a company, a main method is a method of providing a QTX file, in which CCM colorimetric values are stored as a file together with specific standard light source conditions, spectrophotometer models, and information on software (SW) that drives the spectrophotometer models, and a switch sample (or color chip), on which CCM colorimetric measurement can be performed by the corresponding company.

Meanwhile, in a dyeing factory, raw cotton fabric is dyed by concentration with monochromatic dyes used in the dyeing factory and then a CCM colorimetric value of the dyed raw cotton fabric is input to a CCM colorimetric system to form basic data of the CCM colorimetric system, and an operator may select the monochromatic dyes corresponding to the CCM colorimetric values of a QTX file, a swatch sample, and the like provided by the customer, using the basic data.

Typically, in the CCM colorimetric system, a mixing ratio between monochromatic dyes can be simulated by calculating a deviation between XYZ values of the monochromatic dyes for a color space coordinate system and XYZ values of a desired color obtained from a QTX file, and an operator selects a suitable mixing ratio among mixing ratios between monochromatic dyes recommended through simulation according to know-how and proceeds with a beaker test (B/T) at a laboratory level.

The operator compares the CCM colorimetric value of the fabric dyed by the B/T with the CCM colorimetric value requested by the customer, and repeatedly performs the B/T to reduce a color difference between the CCM colorimetric value of the fabric dyed by the B/T and the CCM colorimetric value requested by the customer.

When the color requested by the customer is reproduced through a laboratory-level B/T, the operator performs scale up and proceeds with experimental dyeing in a 100 kg dyeing machine. The operator once again measures a CCM colorimetric value of the fabric dyed by the experimental dyeing, compares the CCM colorimetric value of the fabric dyed by the experimental dyeing with the CCM colorimetric value requested by the customer, and proceeds with a process of reducing a color difference between the CCM colorimetric value of the fabric dyed by the experimental dyeing and the CCM colorimetric value requested by the customer. Thereafter, even in in situ dyeing (a continuous dyeing process), a correction process to reduce the color difference between the CCM colorimetric value of the dyed fabric and the CCM colorimetric value requested by the customer is repeatedly performed, the color difference between the CCM colorimetric value of the dyed fabric and the CCM colorimetric value requested by the customer is then checked again in a process of inspecting a final dyed and processed product, and finally, the dyeing process ends when the color desired by the customer is reproduced in the dyeing factory.

An important point in such a dyeing process is that a skilled operator with know-how acquired over a long time should mix the monochromatic dyes used in the dyeing factory on the basis of the know-how to reproduce the color requested by the customer. It is unknown whether the mixed dye determined by the selection of a specific operator is composed of an optimal combination of dye candidates, and there is a problem in that, in the case of reproducing the color requested by the customer through the operator's know-how, the reliability of a task is lowered when a specific operator is absent or when an inexperienced operator performs the corresponding task.

Further, in the B/T stage, the monochromatic dyes are dyed on 100% raw fabric, and then the colorimetric value measured by the CCM colorimetric machine is compared with the CCM colorimetric value requested by the customer. In general, since the CCM colorimetric value provided by the customer is a CCM colorimetric value of fabric in which various components are mixed, a difference may occur between the fabric requested by the customer in the actual field and the fabric dyed at the B/T stage. For this reason, in order to produce one final dyed product, the B/T stage is repeatedly performed, and accordingly, there is a problem in that a great deal of time and money are spent.

SUMMARY OF THE INVENTION

The present invention is directed to providing an apparatus and method for correcting a mixing ratio of monochromatic dyes, in which a mixing ratio between monochromatic dyes can be corrected and supplemented by utilizing absorption ratio data or absorbance data calculated from reflection ratio data for each of a desired color and the monochromatic dyes that are measured through a spectrophotometer, so that the desired color can be easily reproduced in a dyeing process in which the monochromatic dyes are mixed to reproduce the desired color.

According to an aspect of the present invention, there is provided an apparatus for estimating an absorption spectrum, which includes a memory, and a processor connected to the memory, wherein the processor estimates a spectrum related to an absorption ratio or absorbance of a mixed dye from a reflection ratio by concentration for each of monochromatic dyes stored in the memory.

The processor may perform a process of estimating an absorption ratio or absorbance by concentration for each of the monochromatic dyes from the reflection ratio by concentration for each of the monochromatic dyes, for a preset wavelength range.

The preset wavelength range may be a wavelength range corresponding to visible light.

The processor may estimate the spectrum related to the absorption ratio or absorbance of the mixed dye by performing a process of estimating the absorption ratio or absorbance of the mixed dye from the absorption ratio or absorbance by concentration for each of the monochromatic dyes for the wavelength range.

The processor may estimate the absorption ratio or absorbance of the mixed dye by summing absorption ratios or absorbances that are determined according to preset mixing conditions according to the mixing conditions.

The mixing conditions may include information on target monochromatic dyes that are used in the formation of the mixed dye by being mixed, a concentration of each of the target monochromatic dyes, and a mixing ratio between the target monochromatic dyes.

According to another aspect of the present invention, there is provided an apparatus for correcting a mixing ratio of monochromatic dyes, which includes a memory, and a processor connected to the memory, wherein the processor estimates a first spectrum related to an absorption ratio or absorbance of a mixed dye from a reflection ratio by concentration for each of monochromatic dyes stored in the memory, estimates, from a reflection ratio of a desired color stored in the memory, a second spectrum related to an absorption ratio or absorbance of the desired color, and corrects a mixing ratio between the monochromatic dyes used in manufacturing the mixed dye on the basis of a result of comparing the first and second spectra.

The processor may perform a process of estimating an absorption ratio or absorbance by concentration for each of the monochromatic dyes from the reflection ratio by concentration for each of the monochromatic dyes, for a preset wavelength range.

The processor may estimate the first spectrum by performing a process of estimating the absorption ratio or absorbance of the mixed dye from the absorption ratio or absorbance by concentration for each of the monochromatic dyes, for the wavelength range.

The processor may estimate the absorption ratio or absorbance of the mixed dye by summing absorption ratios or absorbances that are determined according to preset mixing conditions according to the mixing conditions.

The mixing conditions may include information on target monochromatic dyes that are used in the formation of the mixed dye by being mixed, a concentration of each of the target monochromatic dyes, and a mixing ratio between the target monochromatic dyes.

The processor may estimate the second spectrum by performing a process of estimating the absorption ratio or absorbance of the desired color from the reflection ratio of the desired color, for a preset wavelength range.

The processor may calculate a deviation between the first spectrum and the second spectrum and correct the mixing ratio on the basis of the deviation.

According to still another aspect of the present invention, there is provided a method of correcting a mixing ratio of monochromatic dyes, which is performed by a computing device including a processor, the method which includes estimating a first spectrum related to an absorption ratio or absorbance of a mixed dye from a reflection ratio by concentration for each of monochromatic dyes, estimating a second spectrum related to an absorption ratio or absorbance of a desired color from a reflection ratio of the desired color, and correcting a mixing ratio between the monochromatic dyes used in manufacturing the mixed dye on the basis of a result of comparing the first and second spectra.

In the estimating of the first spectrum, a process of estimating an absorption ratio or absorbance by concentration for each of the monochromatic dyes from the reflection ratio by concentration for each of the monochromatic dyes may be performed for a preset wavelength range.

In the estimating of the first spectrum, the first spectrum may be estimated by performing a process of estimating the absorption ratio or absorbance of the mixed dye from the absorption ratio or absorbance by concentration for each of the monochromatic dyes, for the wavelength range.

In the estimating of the first spectrum, the absorption ratio or absorbance of the mixed dye may be estimated by summing absorption ratios or absorbances that are determined according to preset mixing conditions according to the mixing conditions.

The mixing conditions may include information on target monochromatic dyes that are used in the formation of the mixed dye by being mixed, a concentration of each of the target monochromatic dyes, and a mixing ratio between the target monochromatic dyes.

In the estimating of the second spectrum, the second spectrum may be estimated by performing a process of estimating the absorption ratio or absorbance of the desired color from the reflection ratio of the desired color, for a preset wavelength range.

In the correcting of the mixing ratio of the monochromatic dyes, a deviation between the first spectrum and the second spectrum may be calculated and the mixing ratio may be corrected based on the deviation.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 3 is an exemplary view showing items and content of a QuickTime

Figure 4:
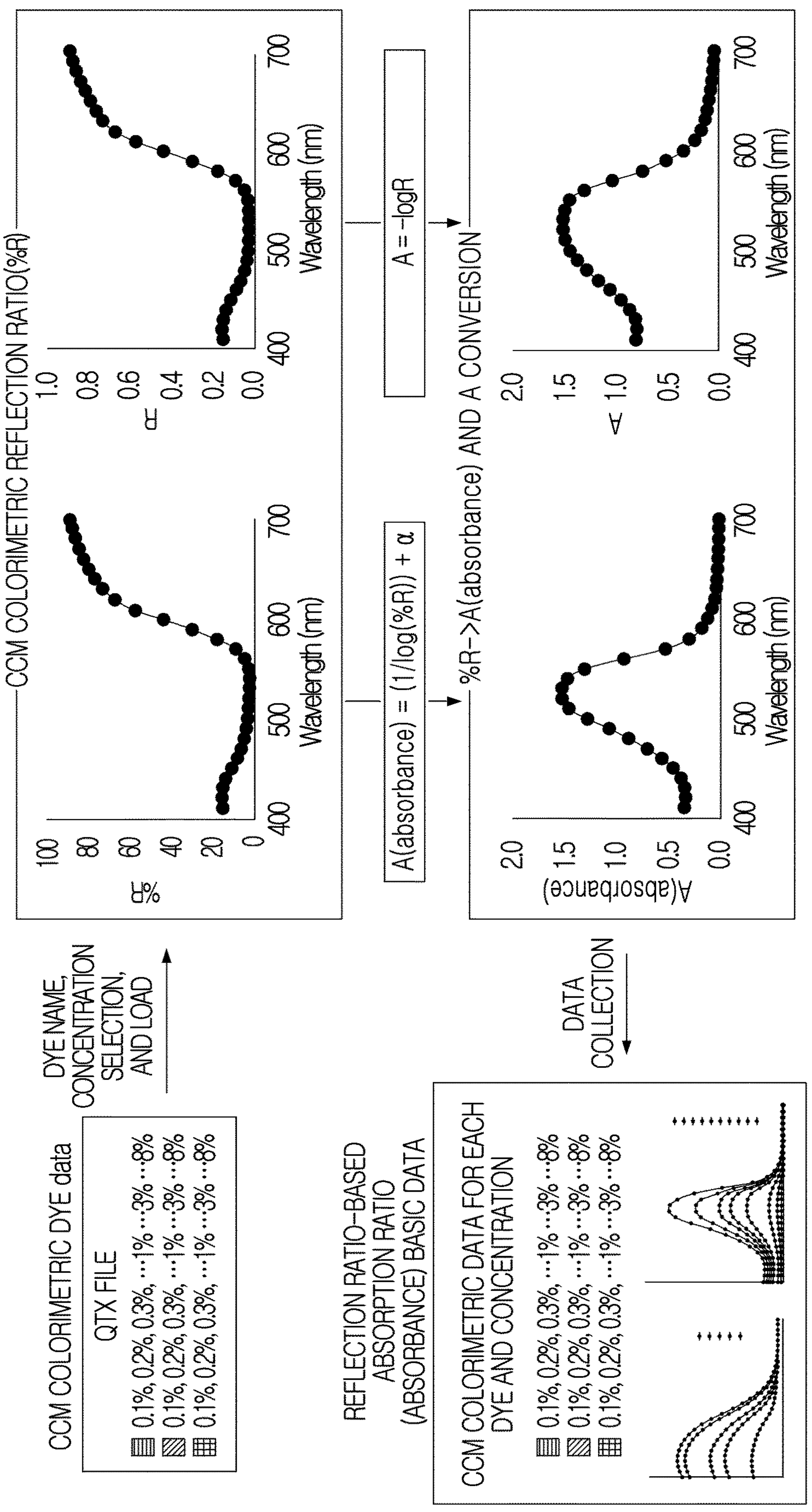
Figure 5A:
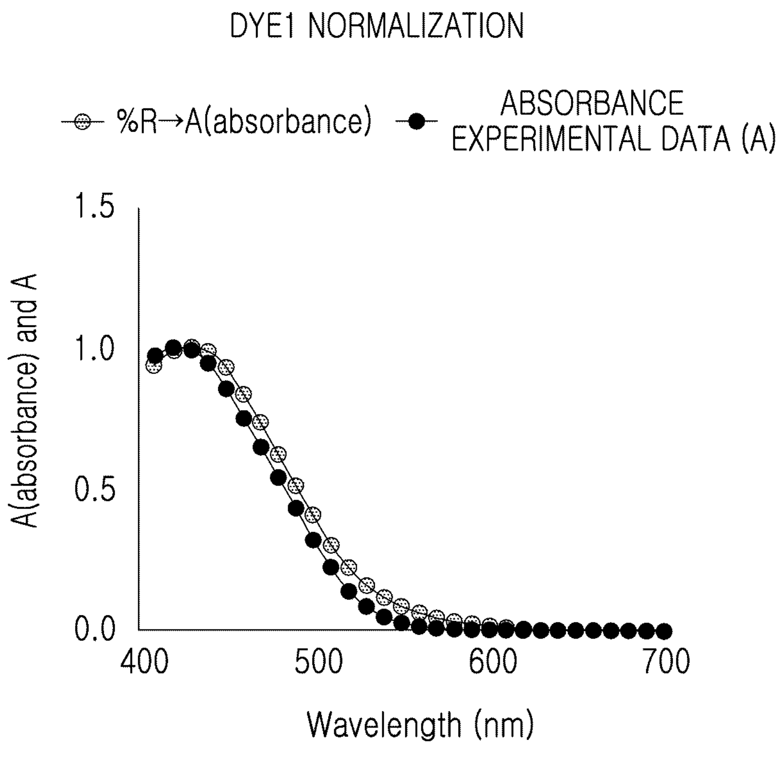
Figure 5B:
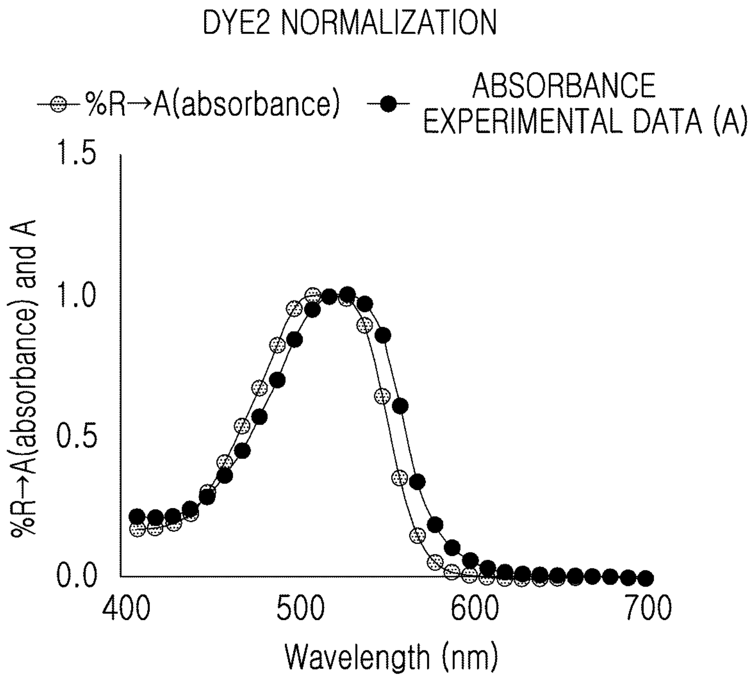
Figure 6A:
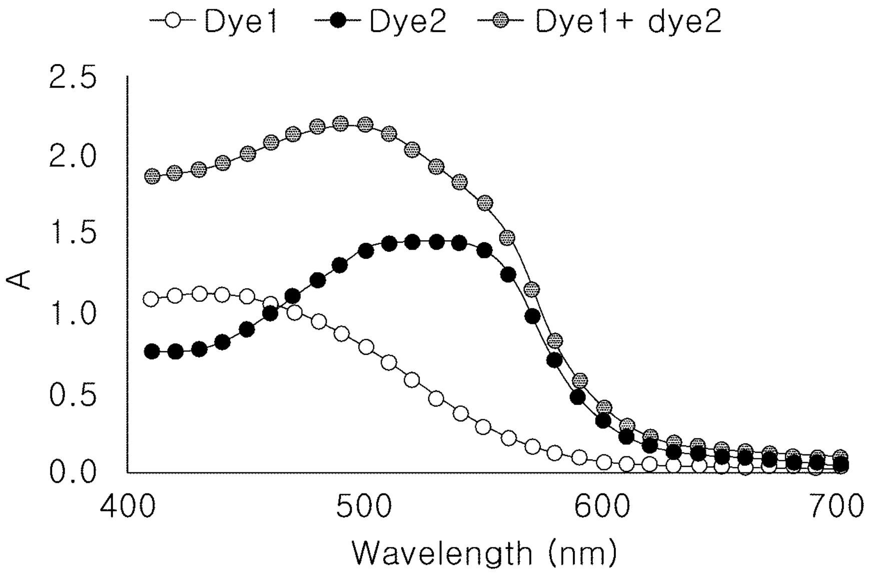
Figure 6B:
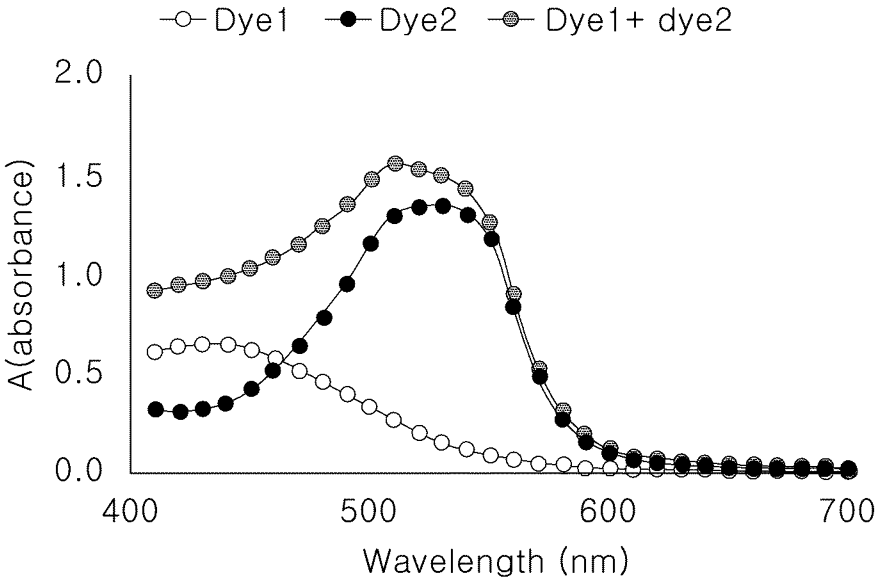
Figure 7A:
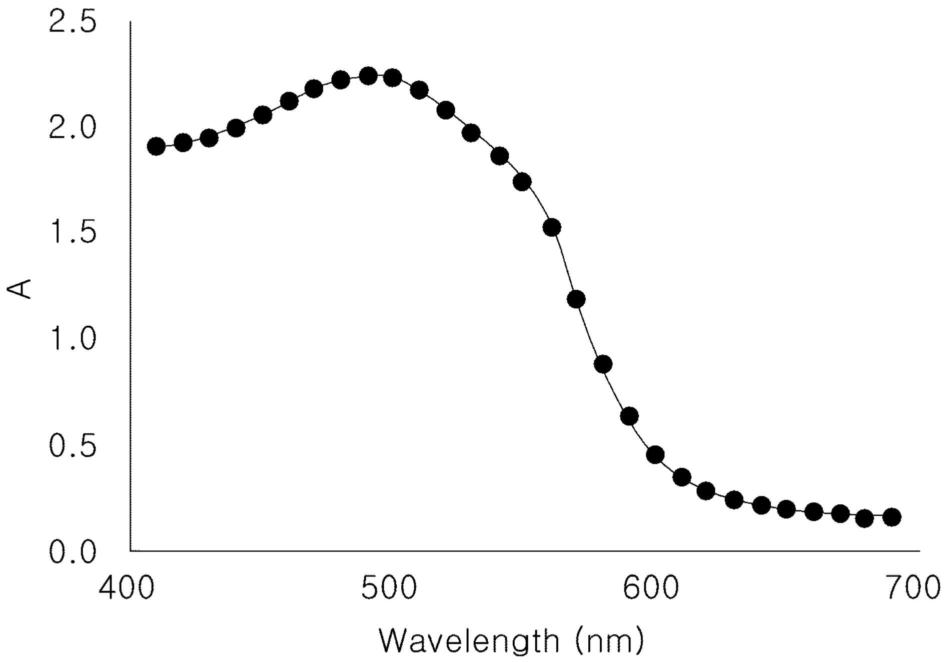
Figure 7B:
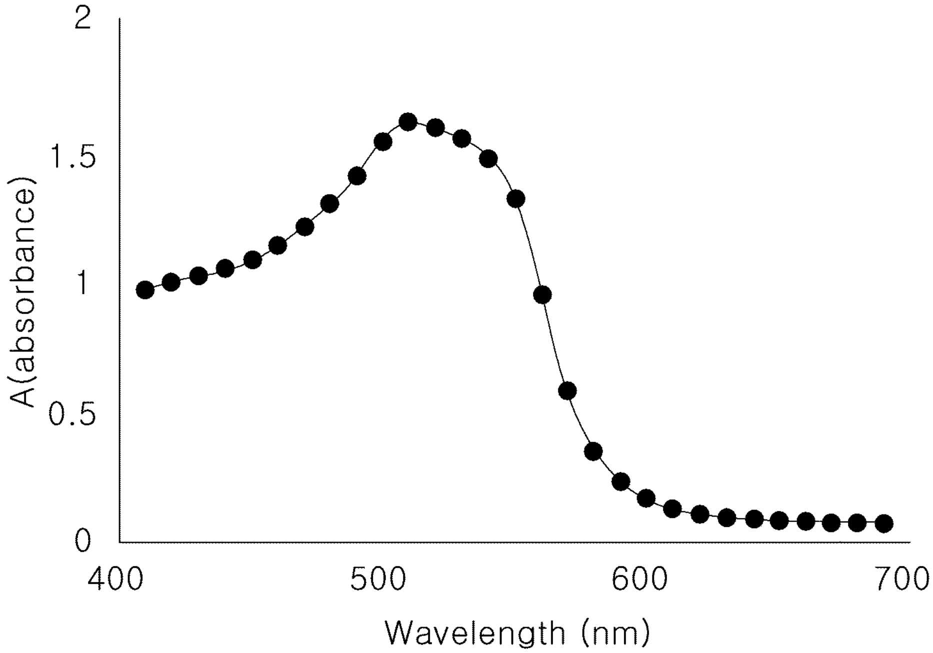
Figure 8:
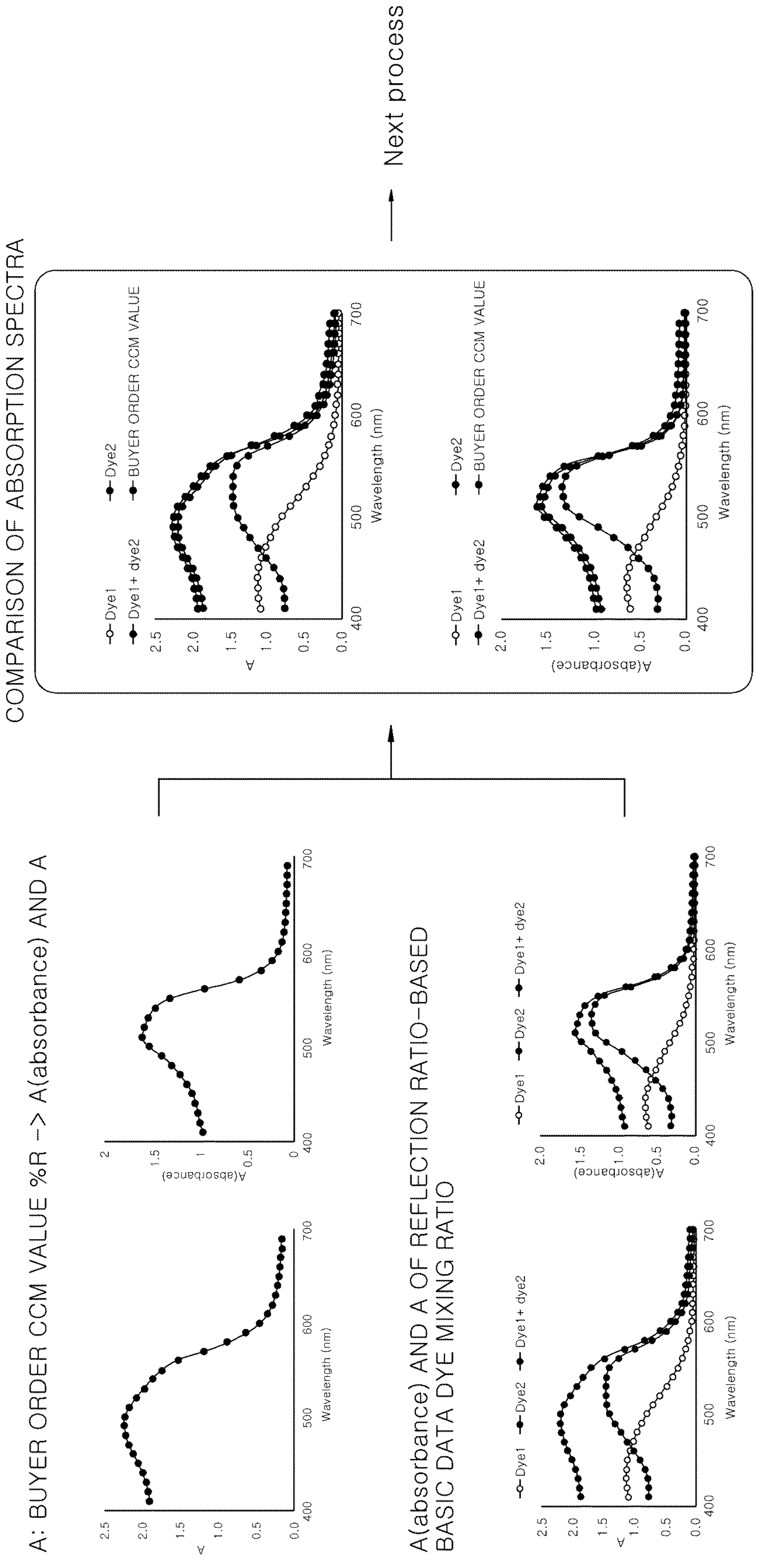
Figure 9A:
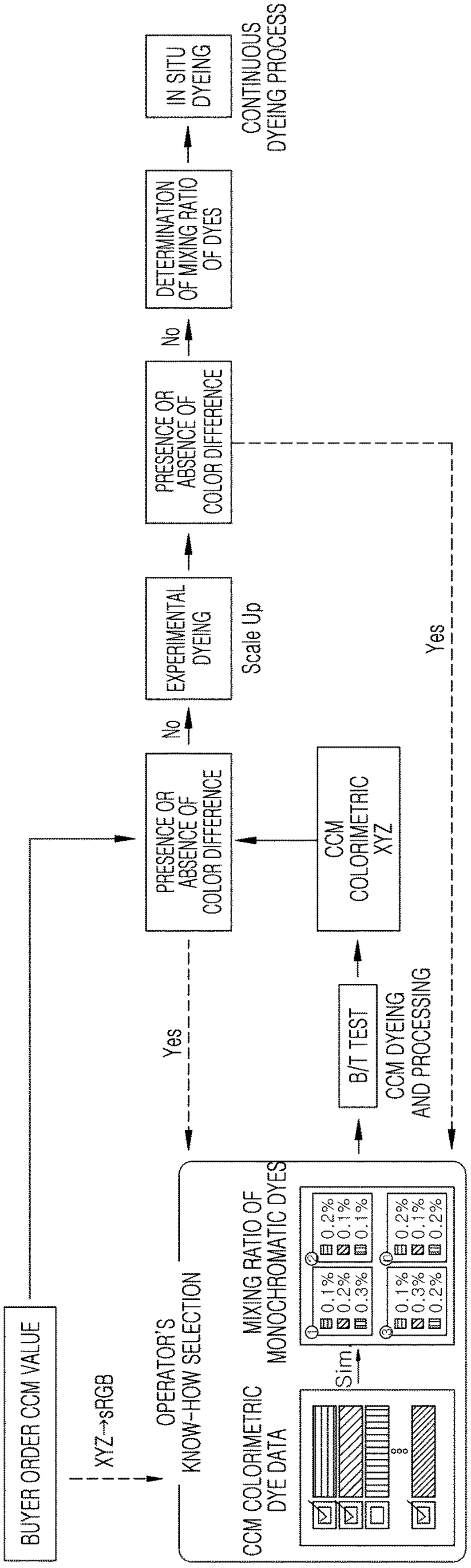
Figure 9B:
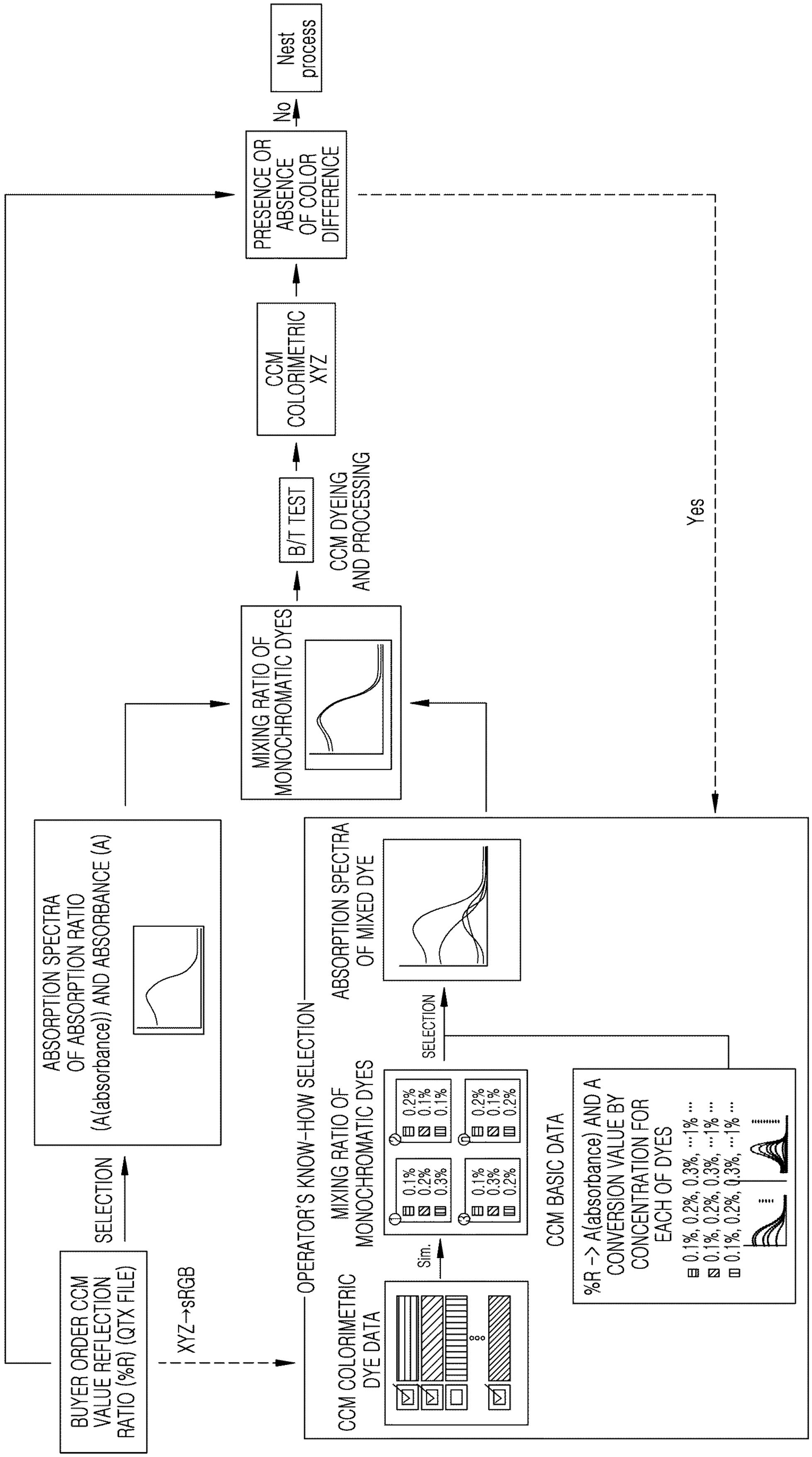

Extension (QTX) file that is a result of computer color matching (CCM) colorimetry;

FIG. 4 is a set of exemplary views showing a process of calculating an absorption ratio or absorbance by concentration for each of monochromatic dyes for a preset wavelength range;

FIGS. 5A and 5B are a set of exemplary views showing a result of comparing a spectrum related to absorbance estimated from a reflection ratio with a spectrum related to actual absorbance;

FIGS. 6A and 6B are a set of exemplary views showing a process of estimating a spectrum related to absorbance or an absorption ratio of a mixed dye from a spectrum related to absorbance or an absorption ratio of each of monochromatic dyes;

FIGS. 7A and 7B are a set of exemplary views showing a result of estimating a spectrum related to absorbance or an absorption ratio of a desired color from a reflection ratio of the desired color;

FIG. 8 is an exemplary view showing a process of comparing a spectrum related to absorbance or an absorption ratio of a mixed dye with a spectrum related to absorbance or an absorption ratio of a desired color; and FIGS. 9A and 9B are a set of exemplary views showing a conventional dyeing process and a dyeing process to which the method of correcting the mixing ratio of the monochromatic dyes according to the embodiment of the present invention is applied.

DETAILED DESCRIPTION OF EXEMPLARY EMBODIMENTS

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

Hereinafter, embodiments of an apparatus and method for correcting a mixing ratio of monochromatic dyes according to the present invention will be described with reference to the accompanying drawings. In this process, thicknesses of lines, sizes of components, and the like shown in the accompanying drawings may be exaggerated for clarity and convenience of description. Further, some terms which will be described below are defined in consideration of functions in the present invention and meanings may vary depending on, for example, a user or operator's intentions or customs. Therefore, the meanings of these terms should be interpreted based on the scope throughout this specification.

Figure 1:
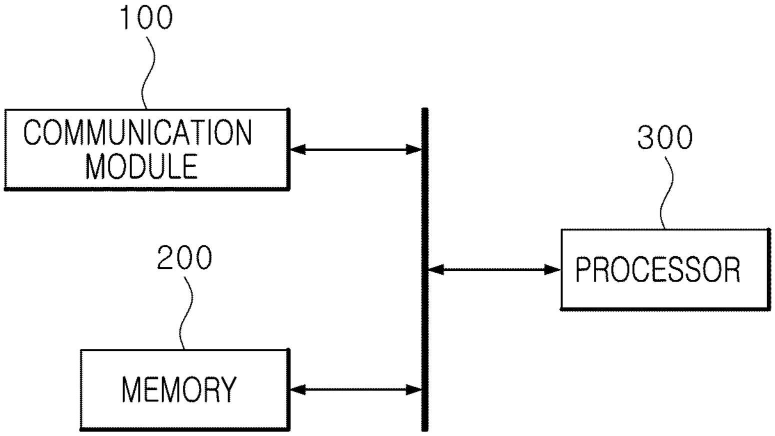
FIG. 1 is a block diagram showing an apparatus for correcting a mixing ratio of monochromatic dyes according to an embodiment of the present invention.

FIG. 1 is a block diagram showing an apparatus for correcting a mixing ratio of monochromatic dyes according to an embodiment of the present invention.

As shown in FIG. 1, the apparatus for correcting the mixing ratio of the monochromatic dyes according to the embodiment of the present invention may include a communication module 100, a memory 200, and a processor 300.

The communication module 100 may communicate with an external device to receive various types of information required in a process of correcting the mixing ratio of the monochromatic dyes. The communication module 100 may communicate with various types of external devices according to various types of communication methods. Information on reflection ratios of the monochromatic dyes may be received from the external device through the communication module 100. Further, information on a reflection ratio of a desired color may be received from the external device through the communication module 100.

Alternatively, in some embodiments, an interface (e.g., a keyboard, a touch screen, Universal Serial Bus (USB), etc.) for data (information) input may be provided, and information that can be input through the communication module 100 may be input through the above-described interface.

In the memory 200, various types of information required during a process of operating the processor 300 may be stored. Further, in the memory 200, various types of information calculated during the process of operating the processor 300 may be stored. Examples of the memory 200 may include a read only memory (ROM), a random access memory (RAM), a flash memory, a memory card, a storage medium, and/or other storage devices. In the memory 200, information on reflection ratios of the monochromatic dyes and desired color received through the communication module 100 may be stored.

The processor 300 may be operatively connected to the communication module 100 and the memory 200. The processor 300 may be implemented as a central processing unit (CPU), a micro controller unit (MCU), or a system on chip (SoC), and the processor 300 may control a plurality of hardware or software components connected to the processor 300 by driving an operating system or application, perform various types of data processing and calculations, execute at least one command stored in the memory 200, and store result data of the execution in the memory 200.

The processor 300 may estimate a first spectrum related to an absorption ratio (or absorbance) of a mixed dye from a reflection ratio by concentration for each of the monochromatic dyes stored in the memory 200, estimate a second spectrum related to an absorption ratio (or absorbance) of the desired color from a reflection ratio of the desired color stored in the memory 200, compare the first and second spectra, and correct the mixing ratio between the monochromatic dyes used in manufacturing the mixed dye on the basis of a result of the comparison. The processor 300 may estimate a spectrum related to the absorption ratio (or absorbance) of each of the mixed dye and the desired color, and use the result of comparing the estimated spectra to correct or supplement the mixing ratio between the monochromatic dyes used in manufacturing the mixed dye.

Figure 2:
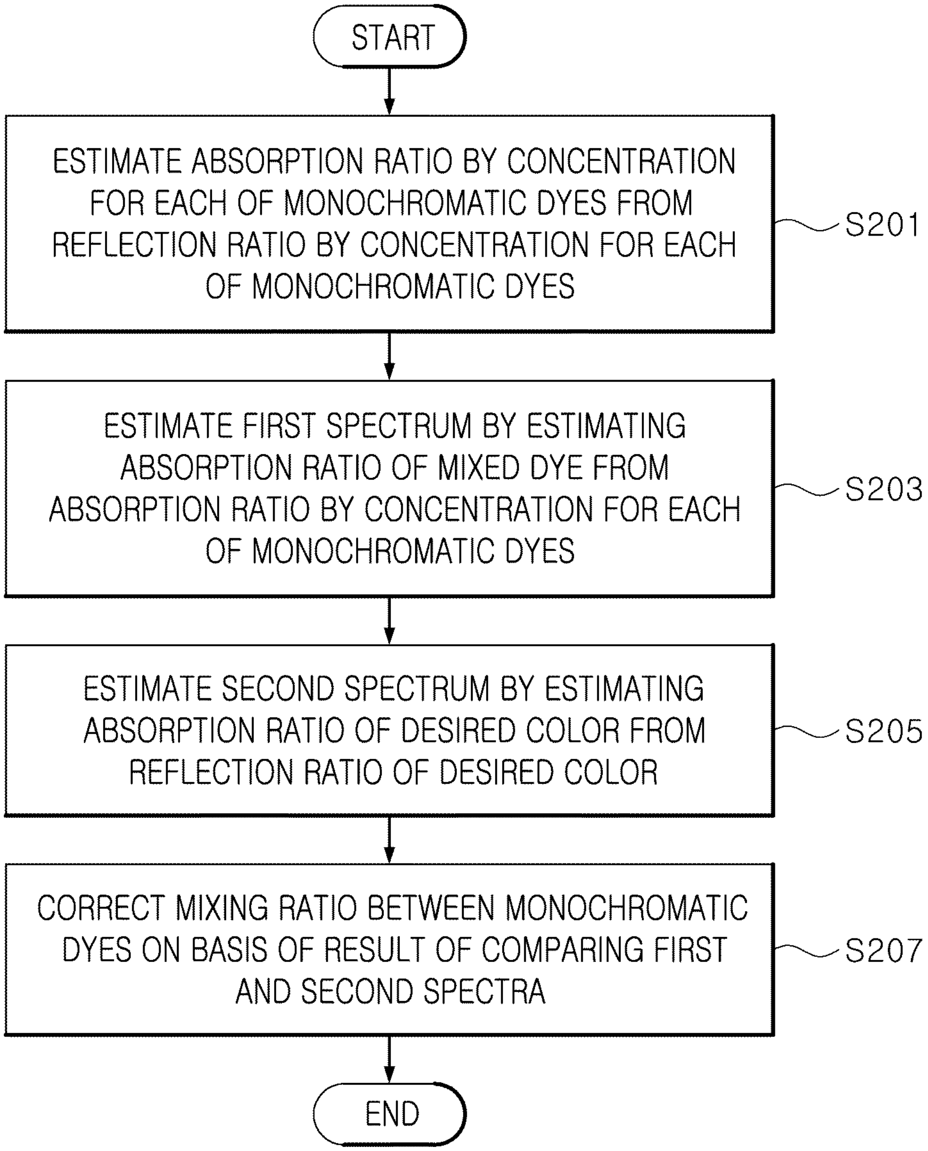
FIG. 2 is a flowchart showing a method of correcting a mixing ratio of monochromatic dyes according to an embodiment of the present invention.

FIG. 2 is a flowchart showing a method of correcting a mixing ratio of monochromatic dyes according to an embodiment of the present invention, FIG. 3 is an exemplary view showing items and content of a QuickTime Extension (QTX) file that is a result of computer color matching (CCM) colorimetry, FIG. 4 is a set of exemplary views showing a process of calculating an absorption ratio or absorbance by concentration for each of monochromatic dyes for a preset wavelength range, FIGS. 5A and 5B are a set of exemplary views showing a result of comparing a spectrum related to absorbance estimated from a reflection ratio with a spectrum related to actual absorbance, FIGS. 6A and 6B are a set of exemplary views showing a process of estimating a spectrum related to absorbance or an absorption ratio of a mixed dye from a spectrum related to absorbance or an absorption ratio of each of monochromatic dyes, FIGS. 7A and 7B are a set of exemplary views showing a result of estimating a spectrum related to absorbance or an absorption ratio of a desired color from a reflection ratio of the desired color, and FIG. 8 is an exemplary view showing a process of comparing the spectrum related to the absorbance or the absorption ratio of the mixed dye with the spectrum related to the absorbance or the absorption ratio of the desired color.

Hereinafter, a method of correcting a mixing ratio of monochromatic dyes according to an embodiment of the present invention will be described with reference to FIGS. 2 to 8. Some processes described below may be performed in an order different from the order described below or may be omitted.

First, the processor 300 may perform a process of estimating an absorption ratio (or absorbance) by concentration for each of monochromatic dyes from a reflection ratio by concentration for each of the monochromatic dyes for a preset wavelength range (S201). Here, the preset wavelength range may be a wavelength range corresponding to visible light, and a preset wavelength range to be described below may also be a wavelength range corresponding to visible light. The processor 300 may reproduce an absorption spectrum in a wavelength range corresponding to visible light by calculating an absorption ratio (or absorbance) by concentration for each of the monochromatic dyes from a reflection ratio described in a QTX file that is a CCM colorimetry result by concentration for each of the monochromatic dyes used in an actual dyeing factory, and configure the absorption spectrum as basic data.

The QTX file may be obtained by performing colorimetry on a specific sample through a spectrophotometer, and transmittance may be mostly ignored when the colorimetry is performed through the spectrophotometer. Referring to FIG. 3, the QTX file may include information on a name and concentration of a dye used for dyeing the corresponding sample. For example, the QTX file may include information, such as reactive dye1 (0.1%), indicating a name and concentration of a dye used for dyeing the corresponding sample. Further, the QTX file may include information on a range of an absorption wavelength. The information on the range of the absorption wavelength may be determined according to a model of the spectrophotometer or set by an operator who uses the spectrophotometer, and may be used to set a wavelength range of an absorption spectrum (i.e., a spectrum related to an absorption ratio or absorbance) in the present invention. Further, the QTX file may include information on a reflection ratio according to the range of the absorption wavelength, and the information on the reflection ratio may be used to calculate an absorption ratio (or absorbance) of a desired color in the present invention. Further, the QTX file may include information on light source conditions in which colorimetry is performed. Since the reflection ratio varies according to the light source conditions, light source conditions when a color corresponding to the corresponding sample is reproduced should also be set the same. Further, the QTX file may include information on XYZ values of a color space for reproducing colors in a CCM system. The XYZ values of the color space may be converted into RGB values by a presser matrix, and may be used to calculate a mixing ratio between monochromatic dyes. The CCM system may calculate a deviation between XYZ values of the monochromatic dyes and XYZ values of a desired color, and recommend a mixing ratio between the monochromatic dyes on the basis of the calculated deviation.

The processor 300 may estimate an absorption ratio (or absorbance) from a reflection ratio using Equation 1 below. As shown in FIG. 4, the processor 300 may estimate an absorption ratio (or absorbance) by concentration for each of the monochromatic dyes by calculating Equation 1 below by concentration for each of the monochromatic dyes.

$$A = -\log R \qquad \text{[Equation 1]}$$

$$A(\text{absorbance}) = \left(\frac{1}{\log(\%\ R)}\right) + a$$

Here, A denotes an absorbance, R denotes a reflectance, A(absorbance) denotes an absorption ratio, % R denotes a reflection ratio, and a is a constant. The reflection ratio may be defined as a percentage of the reflectance. As shown in FIG. 5, it can be confirmed that a result of normalizing a spectrum (red) related to an absorbance for a specific sample estimated by the present invention and a result of normalizing experimental data (blue) for the specific sample measured with an ultraviolet (UV) spectrophotometer are compared and very similar. Meanwhile, as in Equation 2, by applying a correction coefficient δ that is determined based on a deviation between an absorption ratio (or absorbance) estimated from a reflection ratio and an actual absorption ratio (or absorbance) to Equation 1, it is possible to improve the accuracy of the estimation of the absorption ratio (or absorbance).

$$A = (-\log R) * \delta \qquad \text{[Equation 2]}$$

-continued $$A(\text{absorbance}) = \left(\frac{\delta}{\log(\%\ R)}\right) + a$$

Next, the processor 300 may estimate a first spectrum, which is a spectrum related to an absorption ratio (or absorbance) of a mixed dye by performing a process of estimating the absorption ratio (or absorbance) of the mixed dye from the absorption ratio (or absorbance) by concentration for each of the monochromatic dyes for a preset wavelength range (S203). The processor 300 may estimate an absorption spectrum of the mixed dye using basic data for monochromatic dyes used in an actual dyeing factory. Here, the mixed dye may be a dye obtained by mixing the monochromatic dyes to reproduce a desired color.

In this case, the processor 300 may estimate the absorption ratio (or absorbance) of the mixed dye by summing absorption ratios (or the absorbances) that are determined according to preset mixing conditions according to the preset mixing conditions. Here, the mixing conditions may include information on target monochromatic dyes that are used in the formation of the mixed dye by being mixed, a concentration of each of the target monochromatic dyes, and a mixing ratio between the target monochromatic dyes. That is, the processor 300 may determine the target monochromatic dyes from among the monochromatic dyes and a concentration of each of the target monochromatic dyes according to the mixing conditions, and estimate the absorption ratio (or absorbance) of the mixed dye by summing absorption ratios (or the absorbances) that correspond to the determined target monochromatic dyes and concentrations according to the mixing conditions (mixing ratio). The mixing conditions may be calculated (recommended) by the CCM system on the basis of the deviation between the XYZ values of the monochromatic dyes and the XYZ values of the desired color. As shown in FIG. 6A, the processor 300 may estimate a spectrum related to the absorbance of the mixed dye by summing spectra related to the absorbances of the target monochromatic dyes. Further, as shown in FIG. 6B, the processor 300 may estimate a spectrum related to the absorption ratio of the mixed dye by summing spectra related to the absorption ratios of the target monochromatic dyes.

For example, when it is assumed that the mixing conditions are dye1 (0.1%), dye2 (0.2%), and the mixing ratio dye1:dye2=2:1, the processor 300 may detect an absorption ratio corresponding to dye1 having a concentration of 0.1% and an absorption ratio corresponding to dye2 having a concentration of 0.2% from the basic data, and calculate a value obtained by adding the absorption ratio*1 of dye2 having the concentration of 0.2% to the absorption ratio*2 of dye1 having the concentration of 0.1% as the absorption ratio of the mixed dye. As described above, in the present invention, it is possible to estimate the spectrum related to the absorption ratio or absorbance of each of the monochromatic dyes, and also estimate the spectrum related to the absorption ratio or absorbance of the mixed dye manufactured with the monochromatic dyes.

Next, the processor 300 may estimate a second spectrum, which is a spectrum related to an absorption ratio (or absorbance) of a desired color by performing a process of estimating an absorption ratio (or absorbance) of the desired color from the reflection ratio of the desired color for a preset wavelength range (S205). Here, the desired color is a color requested by a customer (buyer), and the processor 300 may obtain the reflection ratio of the desired color by receiving a QTX file for the desired color from the customer through the communication module 100 or may obtain the reflection ratio of the desired color by receiving a QTX file that is obtained by measuring color chips, swatch samples, etc. provided from the customer through the spectrophotometer, through the communication module 100. As shown in FIG. 7, the processor 300 may calculate the absorption ratio (or absorbance) of the desired color by calculating Equation 1 above for the desired color.

Next, the processor 300 may compare the first spectrum, which is the spectrum related to the absorption ratio (or absorbance) of the mixed dye, with the second spectrum, which is the spectrum related to the absorption ratio (or absorbance) of the desired color, and correct the mixing ratio between the monochromatic dyes used in manufacturing the mixed dye on the basis of the result of the comparison (S207). As shown in FIG. 8, the processor 300 may compare the first spectrum, which is the spectrum related to the absorption ratio (or absorbance) of the mixed dye, with the second spectrum, which is the spectrum related to the absorption ratio (or absorbance) of the desired color, to check how similar the mixed dye is to the desired color or how different the mixed dye is from the desired color, and may use information on the comparison result to correct the mixing ratio for manufacturing the mixed dye, and thus a color difference between the desired color and the mixed dye may be reduced.

In this case, the processor 300 may calculate a deviation between the first spectrum, which is the spectrum related to the absorption ratio (or absorbance) of the mixed dye, and the second spectrum, which is the spectrum related to the absorption ratio (or absorbance) of the desired color, and correct the mixing ratio between the monochromatic dyes used in manufacturing the mixed dye on the basis of the calculated deviation. The processor 300 may calculate a deviation between the first spectrum, which is the spectrum related to the absorption ratio (or absorbance) of the mixed color, and the second spectrum, which is the spectrum related to the absorption ratio (or absorbance) of the desired dye, and use information on the calculated deviation to correct the mixing ratio for manufacturing the mixed dye, and thus the color difference between the desired color and the mixed dye may be reduced.

Meanwhile, in the description of the embodiments of the present invention described above, although spectra each related to any one of an absorption ratio and absorbance are calculated for a desired color and a mixed dye and a result of comparing the calculated spectra is used to correct a mixing ratio of the mixed dye, both a result of calculating and comparing the spectra on the absorption ratio of the desired color and mixed dye and a result of calculating and comparing the spectra on the absorbance of the desired color and mixed dye may be used to correct the mixing ratio of the mixed dye.

FIGS. 9A and 9B are a set of exemplary views showing a conventional dyeing process and a dyeing process to which the method of correcting the mixing ratio of the monochromatic dyes according to the embodiment of the present invention is applied. In the case of a conventional dyeing process, since correction of a mixing ratio between monochromatic dyes is entirely dependent on the know-how of operators, an unskilled operator may require excessive trial and error in a dyeing factory to reproduce a color required by a buyer, and even a skilled operator may require excessive trial and error when a color requested by a buyer is a color that the operator has no experience in reproducing. However, as shown in FIG. 9, in the case of the dyeing process to which the present invention is applied, since a mixing ratio may be automatically corrected from absorption ratio data or absorbance data calculated from reflection ratio data for each of a desired color and monochromatic dyes, even an unskilled operator can easily reproduce a color required by a buyer.

As described above, in the present invention, by correcting and supplementing a mixing ratio between monochromatic dyes by utilizing absorption ratio data or absorbance data calculated from reflection ratio data for each of a desired color and the monochromatic dyes that are measured through a spectrophotometer, it is possible to easily reproduce the desired color in a dyeing process in which the monochromatic dyes are mixed to reproduce the desired color. Therefore, in the present invention, even an unskilled operator can reproduce the desired color more easily, it is possible to reduce time required to reproduce the desired color by reducing trial and error that occurs in the process of reproducing the desired color (a beaker test (B/T), experimental dyeing, in situ dyeing, etc.), and it is possible to reduce costs required for reproducing the desired color by reducing dyes, water, salt additives, chemicals, energy, and the like consumed in the process of reproducing the desired color.

In the apparatus and method for correcting the mixing ratio of the monochromatic dyes according to the present invention, by correcting and supplementing a mixing ratio between monochromatic dyes by utilizing absorption ratio data or absorbance data calculated from reflection ratio data for each of a desired color and the monochromatic dyes that are measured through a spectrophotometer, it is possible to easily reproduce the desired color in a dyeing process in which the monochromatic dyes are mixed to reproduce the desired color.

While the present invention has been described with reference to the embodiment illustrated in the accompanying drawings, the embodiment should be considered in a descriptive sense only, and it should be understood by those skilled in the art that various alterations and other equivalent embodiments may be made. Therefore, the scope of the present invention should be defined by only the following claims.

What is claimed is:

1. An apparatus for estimating an absorption spectrum, comprising:

a memory configured to store data representing reflection ratios at respective concentrations for each of a plurality of monochromatic dyes; and a processor connected to the memory, wherein the processor is configured to:

estimate, for a preset wavelength range, absorption ratios or absorbances at the respective concentrations for the respective monochromatic dyes from the data representing the reflection ratios at the respective concentrations; and estimate a spectrum related to an absorption ratio or absorbance of a mixed dye by summing, according to preset mixing conditions, absorption ratios or absorbances corresponding to target monochromatic dyes at respective concentrations specified by the preset mixing conditions, wherein the preset mixing conditions include information on the target monochromatic dyes used to form the mixed dye, the concentrations of the target monochromatic dyes, and a mixing ratio between the target monochromatic dyes.

2. The apparatus of claim 1, wherein the data representing the reflection ratios at the respective concentrations includes reflection ratios obtained by colorimetry using a spectrophotometer for samples corresponding to the respective monochromatic dyes at the respective concentrations.

3. The apparatus of claim 1, wherein the preset wavelength range is a wavelength range corresponding to visible light.

4. The apparatus of claim 1, wherein the processor estimates the absorption ratios or absorbances at the respective concentrations by converting the reflection ratios at the respective concentrations using an equation defining a relationship between reflectance and absorbance.

5. The apparatus of claim 4, wherein the processor applies a correction coefficient to the equation, the correction coefficient being determined based on a deviation between an absorption ratio or absorbance estimated from a reflection ratio and an actual absorption ratio or absorbance.

6. The apparatus of claim 1, wherein the processor estimates the spectrum related to the absorption ratio or absorbance of the mixed dye by weighting the absorption ratios or absorbances corresponding to the target monochromatic dyes at the respective concentrations according to the mixing ratio and summing the weighted absorption ratios or absorbances.

7. An apparatus for correcting a mixing ratio of monochromatic dyes, comprising:

a memory; and a processor connected to the memory, wherein the processor estimates a first spectrum related to an absorption ratio or absorbance of a mixed dye from a reflection ratio by concentration for each of monochromatic dyes stored in the memory, estimates, from a reflection ratio of a desired color stored in the memory, a second spectrum related to an absorption ratio or absorbance of the desired color, and corrects a mixing ratio between the monochromatic dyes used in manufacturing the mixed dye on the basis of a result of comparing the first and second spectra.

8. The apparatus of claim 7, wherein the processor performs a process of estimating an absorption ratio or absorbance by concentration for each of the monochromatic dyes from the reflection ratio by concentration for each of the monochromatic dyes, for a preset wavelength range.

9. The apparatus of claim 8, wherein the processor estimates the first spectrum by performing a process of estimating the absorption ratio or absorbance of the mixed dye from the absorption ratio or absorbance by concentration for each of the monochromatic dyes, for the wavelength range.

10. The apparatus of claim 9, wherein the processor estimates the absorption ratio or absorbance of the mixed dye by summing absorption ratios or absorbances that are determined according to preset mixing conditions according to the mixing conditions.

11. The apparatus of claim 10, wherein the mixing conditions include information on target monochromatic dyes that are used in the formation of the mixed dye by being mixed, a concentration of each of the target monochromatic dyes, and a mixing ratio between the target monochromatic dyes.

12. The apparatus of claim 7, wherein the processor estimates the second spectrum by performing a process of estimating the absorption ratio or absorbance of the desired color from the reflection ratio of the desired color, for a preset wavelength range.

13. The apparatus of claim 7, wherein the processor calculates a deviation between the first spectrum and the second spectrum and corrects the mixing ratio on the basis of the deviation.

14. A method of correcting a mixing ratio of monochromatic dyes, which is performed by a computing device including a processor, the method comprising:

estimating a first spectrum related to an absorption ratio or absorbance of a mixed dye from a reflection ratio by concentration for each of monochromatic dyes;

estimating a second spectrum related to an absorption ratio or absorbance of a desired color from a reflection ratio of the desired color; and correcting a mixing ratio between the monochromatic dyes used in manufacturing the mixed dye on the basis of a result of comparing the first and second spectra.

15. The method of claim 14, wherein, in the estimating of the first spectrum, a process of estimating an absorption ratio or absorbance by concentration for each of the monochromatic dyes from the reflection ratio by concentration for each of the monochromatic dyes is performed for a preset wavelength range.

16. The method of claim 15, wherein, in the estimating of the first spectrum, the first spectrum is estimated by performing a process of estimating the absorption ratio or absorbance of the mixed dye from the absorption ratio or absorbance by concentration for each of the monochromatic dyes, for the wavelength range.

17. The method of claim 16, wherein, in the estimating of the first spectrum, the absorption ratio or absorbance of the mixed dye is estimated by summing absorption ratios or absorbances that are determined according to preset mixing conditions according to the mixing conditions.

18. The method of claim 17, wherein the mixing conditions include information on target monochromatic dyes that are used in the formation of the mixed dye by being mixed, a concentration of each of the target monochromatic dyes, and a mixing ratio between the target monochromatic dyes.

19. The method of claim 14, wherein, in the estimating of the second spectrum, the second spectrum is estimated by performing a process of estimating the absorption ratio or absorbance of the desired color from the reflection ratio of the desired color, for a preset wavelength range.

20. The method of claim 14, wherein, in the correcting of the mixing ratio of the monochromatic dyes, a deviation between the first spectrum and the second spectrum is calculated and the mixing ratio is corrected based on the deviation.

* * * * *